United States Patent [19]

Erhardt

[11] Patent Number: 5,023,711
[45] Date of Patent: Jun. 11, 1991

[54] LINE SCANNING APPARATUS USING STAGGERED LINEAR SEGMENTS WITH ADJOINING OVERLAP REGIONS

[75] Inventor: Herbert J. Erhardt, Rochester, N.Y.
[73] Assignee: Eastman Kodak Company, Rochester, N.Y.
[21] Appl. No.: 422,254
[22] Filed: Oct. 16, 1989
[51] Int. Cl.⁵ .............................................. H04N 3/10
[52] U.S. Cl. ...................................... 358/76; 358/75; 358/80; 358/54
[58] Field of Search ....................... 358/75, 76, 77, 78, 358/79, 80, 212, 213, 214, 215, 216, 54

[56] References Cited

U.S. PATENT DOCUMENTS

| | | |
|---|---|---|
| 4,005,285 | 1/1977 | Price . |
| 4,009,388 | 2/1977 | Seachman . |
| 4,092,632 | 5/1978 | Agulnek . |
| 4,271,429 | 6/1981 | Herbst . |
| 4,275,422 | 6/1981 | Le Couteur ......................... 358/214 |
| 4,358,794 | 11/1982 | Kurakami et al. . |
| 4,692,812 | 9/1987 | Hirahara et al. . |
| 4,707,615 | 11/1987 | Hosaka . |
| 4,742,240 | 5/1988 | Yamanishi et al. . |
| 4,743,751 | 5/1988 | Arques et al. . |
| 4,750,048 | 6/1988 | Satoh et al. . |
| 4,777,525 | 10/1988 | Preston, Jr. ......................... 358/75 |
| 4,833,724 | 5/1989 | Goel . |
| 4,839,719 | 6/1989 | Hirota et al. . |
| 4,891,690 | 1/1990 | Hasegawa et al. ................... 358/75 |
| 4,903,131 | 2/1990 | Lingemann et al. ................. 358/214 |
| 4,942,462 | 7/1990 | Shiota ................................. 358/75 |

FOREIGN PATENT DOCUMENTS 0284043 9/1988 European Pat. Off. .
3610271 10/1986 Fed. Rep. of Germany .

OTHER PUBLICATIONS

U.S. Ser. No. 373,309, filed 6-29-89, "Method and Apparatus for Generating a High Definition Electronic Signal from a Scan of a Color Original" in Spec. p. 2 on Line 16.

Primary Examiner—Howard W. Britton
Assistant Examiner—Michael H. Lee
Attorney, Agent, or Firm—David M. Woods

[57] ABSTRACT

A linear sensor composed of substantially like-sized segments generates a high definition television signal from a line scan of a motion picture film. By staggering the linear segments and overlapping adjoining ends thereof, the sampled signal outputs of the several segments can be applied to a series of digital filters that operate independently to provide filtered output signals that can be grouped together without processing artifacts at the crossover points. More particularly, the overlapping regions of the linear segments are configured in relation to the processing kernal required by the digital filters such that contiguous, processed samples on either side of each crossover point are derived from sample strings wholly within a respective linear segment.

14 Claims, 2 Drawing Sheets

LINE SCANNING APPARATUS USING STAGGERED LINEAR SEGMENTS WITH ADJOINING OVERLAP REGIONS

BACKGROUND OF THE INVENTION

1. Technical Field

This invention pertains to the field of electronic image generation and, more particularly, to scanning apparatus for producing electronic picture signals from an original and to signal processing techniques for use therewith.

2. Background Art

Although generally useful in the electronic imaging art, this invention has special application to a linear array film scanner used in a telecine machine for producing a high definition television signal from a motion picture film. A linear array film scanner typically uses a light-sensitive linear charge-coupled device (CCD), which provides a serial output representing a line of a television raster. The film is driven at a uniform rate between the linear array device and a light source in a direction perpendicular to the linear dimension of the sensor array. The film motion provides the vertical (frame) scan and the linear cycling of the CCD array provides the horizontal (line) scan.

The extension of linear array techniques directly to high definition television, which requires more lines of much higher resolution than in conventional television, is difficult for several reasons. To begin with, existing arrays will not work fast enough to read out at the data rates required for high definition scanning. For example, a high definition frame of 1920 pixels/line for 1035 lines/frame requires a very high output data rate of at least 60 mH—partly due to higher resolution in the horizontal (line) scanning direction and partly due to increased line scans in the vertical (frame) scanning direction. (Indeed, the data rate of 60 mHz would only be adequate if the full frame height could be used to provide data. In practice, because the high definition aspect ratio is 16:9 whereas the conventional motion picture film aspect ratio is 4:3, only about 62% of the film frame height is used. As a consequence, a much higher data rate of about 100 mHz or more is needed.) Furthermore, considering the very short linear scanning times involved in reading the required resolution, the sensitivity of existing devices is not high enough to provide good signal-to-noise performance.

These problems are addressed by U.S. Ser. No. 373,309, filed Jun. 29, 1989, entitled "Method and Apparatus for Generating a High Definition Electronic Signal from a Line Scan of a Color Original," by R. A. Sharman and R. T. Lees, and assigned to the same assignee as the present application. U.S. Ser. No. 373,309 discloses a motion picture film scanner for generating a high definition television signal from the combination of a high definition detail component and a plurality of lower definition color components. The lower definition color components are obtained from three low resolution linear array sensors producing unsharp red, green and blue signals. The detail component is obtained from a luminance array divided into four like-sized segments arranged end-to-end in a single line; multiple registers, one for each segment, are then used to reach the data rate required for high definition scanning. The color photosites are larger than the luminance photosites for improved sensitivity and signal-to-noise performance. By further selecting the number of photosites in each luminance segment to be a submultiple of the number of photosites in a color array, a common, achievable clock signal is used to read out all the linear arrays. Plural lines of luminance are thus output for each line of color, thus yielding lower color resolution in the vertical as well as the horizontal scanning direction.

Misalignment problems are significant with line scanning apparatus employing a multiplicity of linear array segments to form one line. In U.S. Pat. No. 4,092,632 the array segments are offset or staggered in relation to each other in the direction of scan with adjoining ends overlapped. During readout, crossover from one array segment to the next is effected within the overlapped areas pursuant to a microscopic (visual) determination of the optimum crossover point. (A similar sensor architecture in U.S. Pat. No. 4,707,615 depends on a calibration procedure using a special test pattern that spans the overlapped areas.)

Despite an acceptable spatial alignment at the crossover point, an artifact may still appear at the "seam" between staggered segments when an image is reconstructed from the line scan. This artifact is typically due to gain and/or DC offsets between the outputs of each of the segments and by differences in charge transfer inefficiency between segments, which degrades the image modulation transfer function (MTF) according to the number of transfers a given charge packet sees.

SUMMARY OF THE INVENTION

One way to approach these problems is to high pass the image data in downstream electronics, which eliminates the lower frequency effects due to electrical offsets. This, however, typically requires the use of a sampled data filter operating on a string of data samples according to an algorithm that includes data from a central photosite (the one being reconstructed) and a number of its surrounding neighbors. At the crossover point, the use of such an algorithm, which overcomes one set of problems, introduces another artifact as the sample string spans adjoining segments. The new artifact is due to high frequency anomalies from one segment to the next.

A smooth transition is obtained, according to the invention, by supporting first and second linear sensors in staggered relationship such that adjoining end portions overlap, thereby establishing a crossover point between the sensors. The line signals are applied to a filter that implements a processing algorithm upon a plurality of line samples. The filter is sequenced between the outputs of the sensors such that horizontally-contiguous filtered samples on either side of the crossover point are derived from neighboring samples that are wholly within a corresponding one of the sensors (including the overlapping region). In one embodiment, the filter is a group of digital filters each connected to respective linear sensors for implementing a high pass filter function. The digital filters are then sequenced between the line signals from the adjoining sensors so that horizontally-contiguous filtered line signals (i.e., from the central photosite) are derived from a processing kernal that is always wholly within one of the sensor arrays.

BRIEF DESCRIPTION OF THE DRAWINGS

The invention will be described in relation to the drawings, in which.

MODE(S) FOR CARRYING OUT THE INVENTION

Since a linear sensor segmented according to the invention is presently used in the conversion of a motion picture film image into an electronic signal, the following description is provided in relation to a motion picture film scanner. Nonetheless, it should be clearly understood that the invention can be practiced in connection with any kind of line scanning operation.

Figure 1:
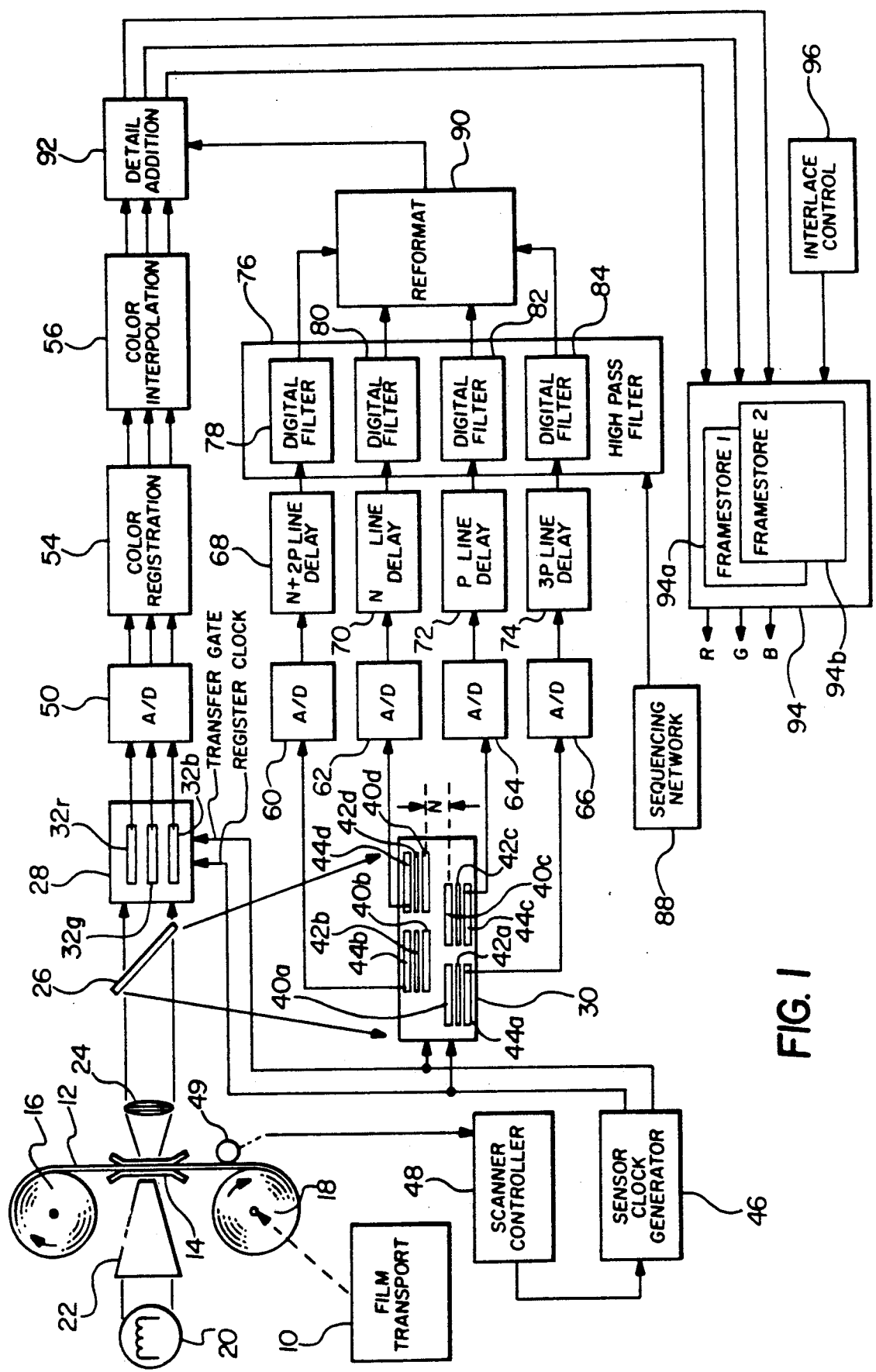
FIG. 1 is a block diagram of a film scanner for generating a high definition electronic signal according to the invention.

Referring first to FIG. 1, a film transport 10 advances a motion picture film 12 at a substantially uniform speed through a film gate 14 from a supply reel 16 to a take up reel 18. A light source 20 generates a light beam that is directed through a circle to line converter 22 and focussed upon a linear section of the film 12 in the film gate 14. The light is modulated by the image in the film 12 and transmitted through an objective lens 24 capable of forming an optical image of a plurality of lines from the film 12. The modulated image is directed to a beam splitter 26, which transmits one portion of the modulated image to an unsharp color sensor 28 and reflects the other portion to a high resolution luminance sensor 30 sensitized to light having a spectral composition approximating a luminance function. The color sensor 28 includes a red-sensitive linear CCD array 32r, a green-sensitive linear CCD array 32g, and a blue-sensitive linear CCD array 32b.

Figure 2:
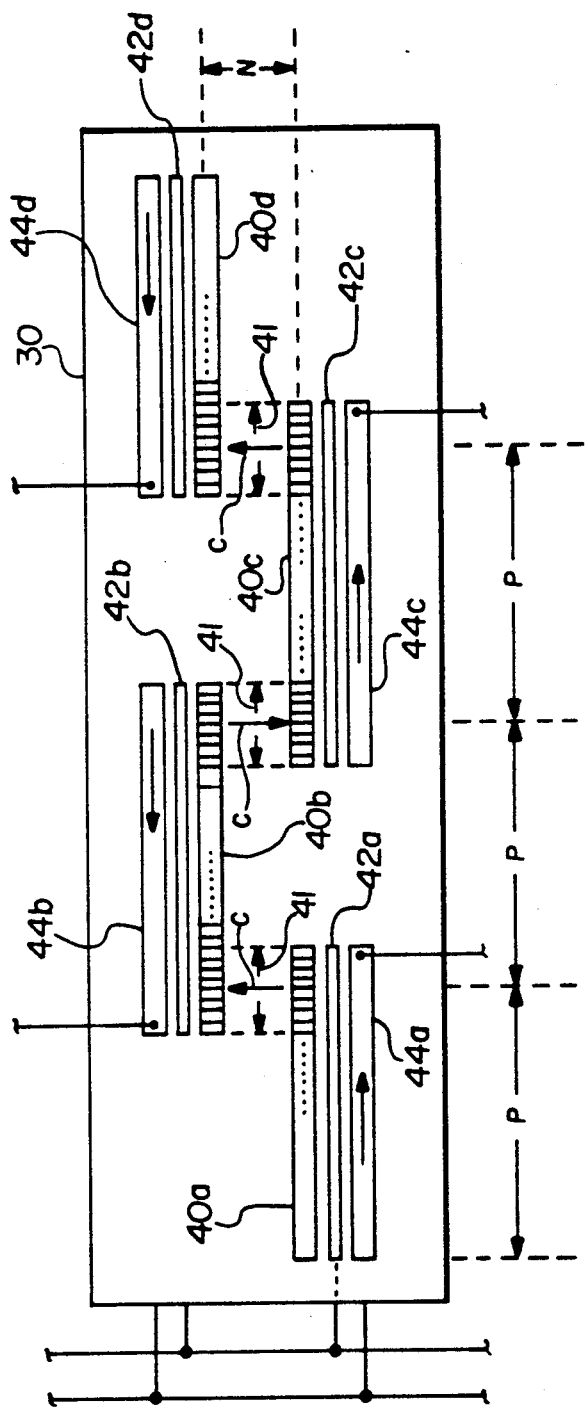
FIG. 2 is a detailed diagram of the overlapping, linear segments forming the high resolution luminance sensor shown in FIG. 1.

As further shown in FIG. 2, the luminance sensor 30 includes four like-sized segments 40a, , 40c and 40d— each including a subset of a full line of photosites; in this embodiment, there are 480 active photosites in each subset plus four outer photosites at either end thereof. The segments are supported on the sensor substrate such that adjoining ends overlap by eight photosites (including the four outer photosites), defining an overlap region 41 between segments 40a and 40b, 40b and 40c, and 40c and 40d. Each full line output thus consists of partial lines of signals from the four segments 40a, 40b, 40c, and 40d joined together at crossover points indicated by the arrows c in FIG. 2. The linear segments 40a and 40c are offset from the linear segments 40b and 40d by an integral number n of lines so that, at any instant, two separate lines from the film 12 are imaged by the objective lens 24 on the sensor 30. The combination of the active photosites of the linear array segments 40a, 40b, 40c and 40d produce a full resolution signal according to the requirements of the high definition standard in use, that is, the sensor 30 includes a sufficient number of active photosites (1920) so as to correspond to the line resolution of the high definition standard. Four transfer gates 42a, 42b, 42c, and 42d are juxtaposed between the segments 40a, 40b, 40c, and 40d and a corresponding plurality of output shift registers 44a, 44b, 44c, and 44d. Image charge accumulated in the charge wells of the segments is transferred to the respective shift registers by dropping the transfer gates low.

A sensor clock generator 46 (FIG. 1) provides an appropriate gating signal (the transfer gate signal) to the transfer gates 42a, 42b, 42c, and 42d to effect charge transfer. In addition, the sensor clock generator 46 provides a clock signal (the register clock signal) of predetermined frequency for shifting the respective image signals from the output registers 44a, 44b, 44c, and 44d to the subsequent processing circuit. In practice, the image charges in all photosites in the sensor 30 are simultaneously gated to the output registers 44a, 44b, 44c, and 44d and then simultaneously shifted therefrom at one-quarter the clock frequency ordinarily needed for the high definition data rate, i.e., the effective data output rate of the luminance sensor 30 is four times the clock frequency applied to the individual output registers 44a, 44b, 44c and 44d. The horizontal (line) scan is provided by transferring image charge from the linear array segments to the output registers, and accordingly clocking the signals from the registers. The vertical (frame) scan is provided by the motion imparted to the film 12 by the film transport 10 (FIG. 1), and typically would allow for more than a thousand (say, 1035) lines in a frame.

In the preferred embodiment, the film is actually run at a speed slightly in excess of 30 frames per second (actually, 31.5 f.p.s.), therefore suggesting a data rate of 120 mHz for the full high definition image. The sensor clock frequency for shifting the image signals from the output registers 44a, 44b, 44c and 44d, consequently, is fixed at 30 mHz, i.e., one-quarter of the high definition data rate. The sensor clock generator 46, furthermore, is responsive to film speed variation via a scanner controller 48 linked to a sprocket wheel 49 engaging perforations in the film 12, accordingly varying the duration of a "dead period" at the end of each line to accommodate the change in line integration time needed if the film speed is varied. (The sensor clock frequency is therefore selected to accommodate the highest film speed that will be encountered.)

As further disclosed in the referenced U.S. Ser. No. 373,309, the color and luminance sensors 28 and 30 cover substantially the same linear dimension, but with different resolution. Low resolution color is provided from the color arrays 32r, 32g, 32b by fewer photosites (960) than for luminance (1920). This provides lower color resolution in the horizontal scanning direction and allows the color photosites to be accordingly larger, which has the advantageous affect of increasing the signal-to-noise performance. In addition, color resolution in the vertical scanning direction is reduced by scanning one line of color for every two lines of luminance, thereby allowing the vertical color dimension to be increased (doubled) in relation to the luminance photosites. The total area of the color photosites is accordingly four times that of the luminance photosites. Taking further into account that the integration time of each color photosite is twice that of a luminance photosite (because each color line is read out half as frequently), the signal from the color photosites realizes an eight-fold noise improvement.

The luminance registers 44a, 44b, 44c, and 44d are read in parallel once for each line while the color registers (not shown) are read in parallel once for every two lines of luminance. Since there are twice as many photosites per register in color as in luminance and the color is read half as frequently, the numbers of photosites read per second is the same for color and luminance; consequently, only a single clock frequency is required to read out all of the registers. A single clock frequency thus interrogates both color and luminance, providing both the necessary data rates and the desired vertical and horizontal resolution.

Referring again to FIG. 1, the unsharp color sensors 28 provide three channels of color data to an analog-to-digital (A/D) converter 50. Because the three color arrays 32r, 32g, 32b are spaced on the sensor 28 in the direction of film motion, the photosites in each linear array correspond to different vertical locations on the film frame. This fixed mis-registration is corrected by a color registration circuit 54, which includes suitable line delays for registering the color lines with each other. Since the digital color values represent lower resolution data than the digital luminance values, additional color values are generated in a color interpolation circuit 56 in both the horizontal and vertical directions. Various conventional interpolation techniques will work. For example, the additional values for the extra high definition locations, which fall between the existing color values, may be a simple repeat of the existing color value before it in the horizontal direction and a repeat of the thus-interpolated line values in the vertical direction. Alternatively, the existing values can be averaged in the horizontal direction and then further averaged in the vertical direction. In either case, the number of color values are expanded to match the number of luminance values in a high definition line.

Meanwhile, the luminance sensor 30 provides four channels of luminance data, one from each register 44a, 44b, 44c, and 44d (FIG. 2), to a group of analog-to-digital converters 60, 62, 64, and 66. The digitized channels are time-aligned in a group of line delays 68, 70, 72, and 74. Recalling that the linear segments 40a and 40c, and 40b and 40d, are oriented to separate lines on the film, the line delays 68 and 70 provide an integral number n of line delays to make up for the center-to-center spacing of the two sets of segments. In addition, the line delays 68, 72, and 74 provide partial line delays p to make up for the respective linear offsets of the linear segments 40a, 40b, and 40c relative to the linear segment 40d.

The delayed signals are then applied to a sampled data high pass filter 76, which filters the delayed signals according to a processing algorithm that includes a plurality of line samples in the generation of a filtered signal. In this embodiment the sampled data filter 76 includes four digital line filters 78, 80, 82 and 84 that operate separately on the signals in the four luminance channels. Each digital line filter is a conventional non-recursive finite impulse response (FIR) filter operating on present and past quantized input samples from the A/D converters 60, 62, 64, and 66. (Quantization, however, is not essential; the sampled data filter 76 could operate on actual analog values of the input samples). In the preferred embodiment, each filter implements a high pass filtering algorithm on an nine sample (x=9) kernal or string of input samples according to the following set of sample weightings:

$$\begin{array}{ccccccccc} x_1 & x_2 & x_3 & x_4 & x_5 & x_6 & x_7 & x_8 & x_9 \\ -1 & -1 & -1 & -1 & +8 & -1 & -1 & -1 & -1 \end{array} \quad (I)$$

where the central photosite $x_5$ is the value being reconstructed for a given spatial position of the kernal.

Figure 3:
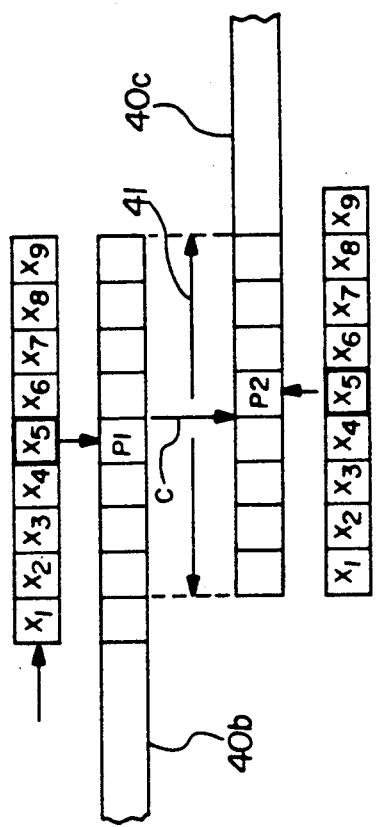
FIG. 3 is further detail of the overlapping area between two of the adjoining linear segments.

As seen best in exemplary form for linear segments 40b and 40c in FIG. 3, the adjoining ends of the linear segments 40b and 40c contain sufficient photosites to wholly contain the processing kernal before a signal crossover between segments occurs, which is indicated by an arrow c. This requires that the overlap region 41 contain at least (x−1) photosites for a given kernal (x). In that manner, the calculation of the value for the central photosite of interest ($p_1$, in FIG. 3) just before crossover is based on a processing kernal wholly within the linear segment 40b. Likewise, the calculation of the value for the photosite of interest ($p_2$, in FIG. 3) just after crossover is based on a processing kernal wholly within the linear segment 40c. The sampled data filter 76 is sequenced for crossover between the constituent line filters 78, 80, 82, and 84 by a sequencing network 88, which may be in the form of conventionally-provided instructions or like control signals from a computer or a suitable controller that functions to gate the output from the filter 76 at the crossover points. The crossover is therefore obtained such that horizontally-contiguous filtered line signals on either side of the crossover point are derived from a kernal of samples that are wholly within a corresponding one of the linear segments.

Various conventional filtering functions can be used; for instance, the signal value of each photosite can be subtracted from an average or sum of the neighboring photosites, either in one dimension (as in (1) above) or two dimensions. This can be repeated for differently-sized neighborhoods to give a set of spatial frequencies representative of various levels of detail in the luminance signal. The signals in the four luminance channels are aligned "end-to-end" to correspond to a physical line in a reformat circuit 90, which may, for example, be a conventional multiplexer triggered in quarter-line sequence to output a continuous detail signal. In addition, depending on the orientation of the luminance line scan in relation to the color line scan, additional delay elements may be included prior to the reformat circuit 90 to register the detail signal with the registered color signals.

The detail is added to each channel of color in an addition circuit 92, forming thereafter a full resolution, high definition color output signal. This high definition output signal is applied to an image store 94, which includes a first framestore 94a and a second framestore 94b. Recalling now that the high definition signal to this point is a sequential signal, an interlace controller 96 loads a video frame sequentially into one framestore while extracting video fields (of a previously loaded frame) in interlace format from the other framestore. A digital red, green, blue high definition field signal is thus provided at the output of the image store 94 for further use, which may include immediate broadcast transmission or recording, e.g., on video tape (after suitable standards conversion or encoding, as necessary).

While the invention has been disclosed for use with a telecine machine that generates a television picture signal from a motion picture film, it is intended that a linear sensor segmented according to the invention could be used with other types of electronic imaging machines providing similar filter functions. One example is a color copier, which also may be used to illustrate a number of modifications that are included within the concept of the invention. For example, rather than moving a color original past the linear arrays, the color copier may instead provide means, such as an oscillating mirror, for moving the scanning beam relative to the linear array (i.e., both the original and the sensors are stationary). Alternatively, the linear arrays can be designed to move across the original. Moreover, the image modulation imparted to the scanning beam can originate from transmission through the original or reflection from the original. Finally, the disclosed non-recursive sampled data filter is merely exemplary of the concept. The invention encompasses other types of filters (e.g., recursive) implementing any desirable function, e.g., lowpass, notch, bandpass, etc.

The invention has been described in detail with particular reference to a presently preferred embodiment, but it will be understood that variations and modifications can be effected within the spirit and scope of the invention.

What is claimed is:

1. Apparatus for generating an electronic signal from a line scan of an original, said apparatus comprising:
    means for forming an optical image of at least two lines from the original;
    first linear sensing means for generating a first signal from a first of said lines;
    second linear sensing means for generating a second signal from a second of said lines;
    means for supporting both said sensing means in staggered relationship in the path of said first and second optical line images such that said adjoining end portions overlap, thereby establishing a crossover point between said sensing means;
    means for sampling the line signals;
    means for filtering the line samples according to a processing algorithm that includes a plurality of said line samples in the generation of a filtered signal; and
    means for sequencing said filtering means between said first and second line signals so that horizontally-contiguous filtered line signals on either side of the crossover point are derived according to the algorithm from a plurality of samples that are wholly within a corresponding one of said sensing means.

2. Apparatus as claimed in claim 1 wherein said processing algorithm comprises a processing kernal that includes a predetermined number of line samples, said first and second linear sensing means comprise separate linear devices with discrete photosites, said linear devices supported such that the photosites comprising said adjoining end portions overlap by at least the predetermined number less one, whereby the processing kernal on either side of said crossover point is wholly composed of photosites within a corresponding one of said linear devices.

3. Apparatus as claimed in claim 2 wherein said first and second linear devices comprise charge-coupled devices.

4. Apparatus as claimed in claim 1 in which the processing algorithm comprises a high pass filter.

5. Apparatus as claimed in claim 1 in which sampling means comprises an analog-to-digital converter that generates digital line signals.

6. Apparatus as claimed in claim 5 in which said filtering means comprises a digital filter for operating upon the digital line signals.

7. Apparatus as claimed in claim 1 in which said first and second sensing means are sensitive to light that is a function of the luminance of the original.

8. Apparatus as claimed in claim 7 further comprising:
    color sensing means for generating a color signal from one or more lines of the original;
    means for sampling the color signal; and
    means for combining the sampled color signals with the filtered line signals from said first and second linear sensing means.

9. Line scanning apparatus for line scanning an original and generating a progression of line samples therefrom, the line samples further being converted into an image signal by a video processor, the improvement wherein said line scanning apparatus comprises:
    a linear sensor for providing the progression of line samples, said linear sensor including a linear array of light-receptive photosites divided into a plurality of substantially like-sized linear segments arranged in staggered relationship such that adjoining ends of at least two segments overlap; and
    said video processor including a filter operating on a string of line samples to generate a progression of filtered samples, and means operative with said filter for sequencing between the segments across the adjoining ends thereof to provide a series of contiguous, filtered line samples derived from sample strings that are exclusively taken from a respective segment including its overlapping region.

10. Line scanning apparatus as claimed in claim 9 wherein said staggered segments are oriented to separate lines of the original.

11. Line scanning apparatus as claimed in claim 10 wherein the line samples from the respective segments oriented to separate lines are converted into separate digital signals and said filter operates on a string of digital values exclusively derived from a corresponding one of the segments.

12. Line scanning apparatus as claimed in claim 11 wherein said filter comprises separate digital filters operating on digital values derived from the separate segments.

13. Line scanning apparatus as claimed in claim 12 wherein said means for sequencing between the segments sequences the output of the separate digital filters such that contiguous filtered line samples at the crossover point are exclusively derived from a string of digital values taken from a corresponding segment on either side of the crossover point.

14. High definition scanning and processing apparatus for scanning a color original and generating a plurality of high definition color signals, said apparatus comprising:
    a plurality of line sensors having respective linear arrays of photosites oriented to separate lines of the color original and arranged in staggered relationship such that adjoining ends overlap, said sensors providing in combination a horizontal resolution corresponding to a predetermined high definition resolution;
    a plurality of color sensors having respective linear arrays of photosites providing lower horizontal resolution than said predetermined resolution;
    pulse generating means for generating a clock signal;
    means for applying the clock signal to the line sensors to generate a high definition image signal and a plurality of lower definition color signals;
    means for interpolating additional color signals from the lower definition color signals so that the combination of the lower definition color signals and the additional color signals form interpolated color signals corresponding in number of color values to the predetermined high definition resolution;
    means for extracting a detail signal from the high definition image signal, said extracting means including plural filters operating on strings of signals from the respective line sensors, wherein the overlapping region between line sensors enables crossover between contiguous values derived from strings of signals wholly within the respective line sensor; and means for generating a plurality of high definition color signals by combining the detail signal with the plurality of interpolated color signals.

* * * * *